United States Patent Office 3,392,036
Patented July 9, 1968

3,392,036
COATING COMPOSITION BINDERS
Gordon D. McLeod, Adrian, Mich., assignor to
Stauffer Chemical Company
No Drawing. Filed Apr. 7, 1965, Ser. No. 446,424
9 Claims. (Cl. 106—1)

ABSTRACT OF THE DISCLOSURE

A binder composition for particulate solids which contains an organic solvent together with the reaction product of an alkyl silicate and an alkyl borate.

---

This invention relates to compositions useful as binders in compositions useful in coating applications such as painting and shell molding. More particularly, this invention is a class of compositions comprising particulate solids and a polymeric silicon-based binder extended and improved by the incorporation of an alkyl borate coproduct.

I have discovered that coatings consisting of a partially hydrolyzed alkoxy silicate or silane plus an alkyl borate cobinder with powdered metallic pigment, refractory or metallic oxide incorporated therein can be applied to metallic, ceramic or organic surfaces in the usual manner, harden more rapidly and with a stronger adhesive bond than when the borate is not present. This invention provides an improved method for binding particulate solid materials providing not only improved protective, heat resistant and galvanic coatings but an improvement in the well-known ceramic shell-low wax process.

Alkyl silicates, especially ethyl silicates, have been used for binding particulate solids such as metals dusts and refractories and metal oxides because of the ability of these silicates to hydrolyze and condense to produce solvent-soluble polymers which on removal of the solvent and absorption of atmospheric moisture continue to hydrolyze and condense, cross-linking first in gelation and then curing to form solid compositions. These hydrolysis and condensation reactions are well-known to be catalyzed by acids or bases. Such silicate compositions have been used as binders for coating compositions such as zinc dust paints and refractory slurries used in the preparation of shell molds for casting. By careful adjustment of hydrolysis and conditions such as acid or base content, water content and temperature extremely stable, relatively anhydrous, highly adhesive silicate polymers can be made. Prior to this invention, high degrees of hydrolysis and high acid concentrations have been necessary to produce coating compositions with reasonable curing times. However, the degree of hydrolysis has a marked effect on shelf life, pot life, gel time of the hydrolyzed silicate and on the green strength of the gelled silicate.

It is the principal object of this invention to provide a silicon-based binder system which is stable in the presence of a solvent, which cures rapidly on removal of the solvent in the presence of atmospheric moisture and which in the gelled state has greater hardness and green strength, i.e., greater adhesive and binding strength, than has heretofore been available. I have discovered that alkyl borates can be added to partially hydrolyzed silicate and siloxane systems as described below to form a stable coproduct having these desired characteristics when used with particulate solids such as metal and metal oxide powders and dusts.

Another object of this invention is to provide a binder coproduct which will cause very rapid hardening of zinc dust-hydrolyzed alkoxy silicate coatings on ferrous or galvanized surfaces. Relatively small amounts of alkoxy borate (2%) coreacted with the alkoxy silicate binder cause hardening to take place in much less time than when the same silicate binder is used without the borate. It is very advantageous to be able to top coat zinc dust primer coatings the next day. The relatively small amounts of alkyl borate added to the silicate binder will accelerate hardening of the coatings overnight to the same extent it may take 20 days to harden without the methyl borate. Zinc dust silicate binder coatings are believed to harden through adsorption of moisture from the air so that if topcoated before proper curing has occurred, the coating may not harden properly. A further advantage is that it often is desirable to walk upon the coating or to use the coated object within a reasonable time after coating. It is often impossible to allow a zinc dust silicate coating to harden for 10 or 20 days before use. Also, post curing as, for example, with salt water, is costly and deteriorates top coatings applied thereafter.

Another object of this invention is to provide a cobinder which has adequate shelf life for long storage at warm temperatures and yet have very rapid curing properties in thin films with zinc dust. The shelf life of ethyl silicate binders usually depends on the degree of hydrolysis and acidity, the higher the shorter the shelf life. By adding alkoxy borates to the binder, very low degrees of hydrolysis and acid concentrations are required to get rapid curing of the resultant zinc dust coating. On the other hand, if the borates are not present, higher degrees of hydrolysis and higher acid containing binders are necessary to get a coating that will harden within a reasonable time. This means shorter shelf life.

Another objective of this invention is to provide a fast curing zinc dust-alkoxy borate-alkoxy silicate (or silane) co-binder coating from a binder and zinc dust that will be stable in one package systems that will cure in a thin film by moisture from the air or spraying and yet remain unreacted but ready for instant use in a one package system for very long periods. I have discovered that this is practical by using alkyl borates with binders having a very low degree of hydrolysis, i.e., no excess water to ¼ mole water per mole of alkoxy group present on the silicate, and very low acidity, i.e., pH of 2 to 3.5, with an acid catalyst such as HCl. This system is a stable slurry in a can or pot, yet when painted on a surface in a thin film, will rapidly cure to a hard galvanic zinc dust coating. Without the borate, at these low degrees of hydrolysis, the coatings will either never harden or will harden at such a slow rate that it is impractical to use them.

We have found that an alkyl borate actually improves the shelf life of partially hydrolyzed alkoxy silicate binders. The borate also improves pot life. However, other boron-containing compounds while accelerating curing contributes to lower shelf life. For example, 2% boric acid based on the weight of silicate in a partially hydrolyzed alkyl silicate binder very markedly shortens its shelf life to such an extent that it is impractical to store for future use in coatings unless very small quantities are present.

Another object of this invention is to provide a fast curing co-binder for use with galvanic metal dusts such as zinc, aluminum and magnesium to form heat resistant coatings.

Another object of this invention is to provide a fast hardening co-binder for use with other metal powders, metal oxide powders, and pigments for inorganic coating for ceramic or metallic surfaces.

Another object of this invention is to provide a faster curing co-binder for use with alkyl silanes either alone or in the presence of hydrolyzed alkoxy silicates. Alkyl borates and alkoxy silanes added to a partially hydrolyzed alkoxy silicate binder yield a more adhesive, flexible, faster curing, waterproof coating. A zinc dust filler helps water resistance appreciably. As little as 2% dimethyl dimethoxy silane in an 87% hydrolyzed ethyl silicate binder (pH 2–4) containing 1% methyl borate produces an excellent fast-drying coating having better flexibility and adhesion.

This invention is a composition derived from a mixture of (A) an alcohol-soluble alkyl silicate in which each of the alkyl groups contains from 1 to 8 carbon atoms and is attached to an oxygen-on-silicon through a primary carbon atom, (B) a solvent having a boiling point ranging from 50° C. to 160° C., said solvent being present in an amount sufficient to make the $SiO_2$ content of A equal to from 8 to 33 percent by weight of the combination of A and B, and (C) from 0.05 to about 80 percent by weight based on the weight of A of an alkyl borate in which each of the alkyl groups contains from 1 to 8 carbon atoms.

Component A of the compositions of this invention is an alcohol-soluble alkyl silicate in which each of the alkyl groups contains from 1 to 8 carbon atoms. While the most common of these are ethyl silicates, other silicates such as methyl silicates, propyl silicates, butyl silicates, hexyl silicates and octyl silicates can be readily employed either alone or in admixture. The silicates containing such groups as hexoxyl, heptoxyl and octoxyl groups are preferably employed in silicate mixtures with lower silicates. For the purposes of this invention, the carbon atom of an alkoxy group attached to an oxygen atom which is attached to a silicon atom, i.e., the carbon atom of an alkyl group attached to a silicon-bonded oxygen atom, should be a primary carbon atom. However, the alkoxy group may have a branched structure otherwise.

The silicates can be orthosilicates or they can be partially hydrolyzed and polymerized to form dimers, trimers, tetramers and the like. As the degree of hydrolysis and polymerization increases, the likelihood of cross-linking and consequent gelation increases. Consequently, it is preferable that prehydrolysis of the silicate should not exceed about 95 percent; i.e., no more than about 0.47 mole of water per mole of alkoxy groups should be reacted with the silicate. Since the reduction in the extent of hydrolysis reduces the likelihood of condensation necessary for gelation, the lower the amount of hydrolysis of a silicate, the better its shelf and pot stability. On the other hand, it is desirable to have some prehydrolysis of the silicate. The silicates suitable for extra long life are preferably about 20 to 70 percent hydrolyzed, i.e., reacted with from 0.1 to 0.35 mole of water per mole of alkoxy groups.

Component B is an alcoholic solvent for A and has a boiling point ranging from about 50° C. to about 160° C. This component is usually a simple alcohol such as methanol, ethanol, propanol, t-butanol and hexanol, or mixtures thereof, but it can contain minor amounts of other compatible solvents which do not cause hydrolysis of A such as hydrocarbons, e.g. xylene, toluene, benzene and hexane, ketones, e.g., acetone and methyl isobutyl ketone, and ethers, e.g., propyl ether and tetrahydrofuran. Similarly, the alcohol can have other functions as most commonly exemplified by the monoethyl ether of ethylene glycol.

Component (B) should be present in an amount so that the $SiO_2$ content of component (A), as determined for example by acidic ashing, ranges from 8 to 33 percent by weight of the combined weights of components (A) and (B). When the $SiO_2$ content is outside this range, the resulting composition does not perform as dependably as desired.

Component (C) is an alkyl borate in which each of the alkyl groups contains from 1 to 8 carbon atoms or $B_2O_3$ or boric acid. The term "borate" includes any alkanol ester of any boric acid. Examples of these include trimethyl borate, triethyl borate, tripropyl borate, triisobutyl borate, trimethoxy boroxine, tri-n-butoxy boroxine, trihexoxy boroxine and the like. The borate or borate mixtures can be added in pure form or in solvent solution as desired. While the boric acid and $B_2O_3$ interact with the binder and zinc dust to cause rapid hardening, it has been observed that they lower the shelf life of the binder while the methyl borate does not. Also, much less $B_2O_3$ or boric acid must be used or the coating becomes too brittle on curing.

While component C can be utilized in amounts ranging from 0.05 to 80 percent by weight based on the weight of component A with noticeable benefits to the final coating, it is preferable that no more than about 10 percent by weight of C based on the weight of A is employed. In compositions of this invention intended for use as paint binders, it is preferable that component C be used in amounts of from 0.5 to 5 percent by weight based on the weight of A.

Generally, water (D) is added during hydrolysis of the silicate. The amount of water is limited by the desired limits of hydrolysis of the silicate component A as described above. Usually no more than about 15 parts by weight of water based on the weight of A are added.

It is preferable to include in the compositions of this invention a small amount of (E) a hydrolysis catalyst which can be either a strong or weak acid or a strong or weak base in accordance with well-known practice. The use of the described borates allows a very low degree of hydrolysis in (A) and low catalyst concentrations with corresponding excellent shelf life and pot life while making possible reasonable curing rates. I have found that hydrochloric acid in very small amounts is an excellent catalyst. This acid should be added in amounts such that the pH of the total compositions, calculated from the hydrogen ion concentration provided by the acid, is no less than about 1.5 and preferably no less than about 3.

The compositions of this invention are preferably prepared by premixing components A and B, adding any of components D and E that are desired and allowing this mixture to age. This process takes place at 25° C. in about 12 hours although it is preferable to allow several days. Aging this composition prior to the addition of component C enhances the effect of component C in the composition of this invention. After addition of C, aging of the composition also improves the binders curing properties in the presence of zinc dust.

The compositions of this invention are excellent binders for particulate solids including metal dusts such as aluminum, stainless steel or zinc; metal oxide powders such as $TiO_2$, alumina, iron oxide, lead oxide, mercury oxide, silica aerogels (with or without organic dyes), mullite and zircon, and powdered compounds and inorganic pigments such as zinc chromate and graphite. These particulate materials (F), or combinations of them, can be employed with the binder composition of this invention to form coating compositions consisting essentially of from 10 to 90 percent by weight of (F) and from 90 to 10 percent by weight of binder. Generally, the more fluid compositions containing nonrefractory materials such as the metal dust and compounds are used as paints whereas the more viscous or heavier compositions containing highly refractory materials such as alumina, silica, zircon, mullite, etc., are used in the preparation of molds by application to a form which is removed after the coating composition has cured.

This invention is more specifically described in the following examples. However, these examples are not intended to limit this invention, the scope of which is delineated in the appended claims. All quantitative measurements are in parts by weight or percent by weight unless otherwise noted.

Example I

In this example, polished steel panels were washed with acetone and allowed to dry. These panels were then brush coated with well-mixed slurries consisting of 60 parts by weight of fine neutral, salt-free zinc dust having a particle size of 2–8 microns and 40 parts by weight of the binder compositions set forth below. The coated panels were allowed to dry in air at 70–80° F. The coatings were tested for adhesion, checked over a period of time for pencil hardness and the resulting galvanic protection properties of the coating on the steel surface evaluated.

For the adhesion test, eleven parallel lines 0.1 inch apart and one inch long were scored through the coating. Similarly, a second set of eleven parallel lines 0.1 inch apart and one inch long were scored through the coating perpendicular to and through the first set of lines forming 100 small squares. Scotch tape was applied to the scored squares and pulled back at 180°. Adhesion was estimated as follows from observation of the removal of the coating by the tape along the lines:

0 to 3% removal—excellent
3 to 6% removal—very good
6 to 10% removal—good
over 10% removal—poor Basic binder compositions.—In each case the silicate and alcohol were mixed, the solution of HCl in water was added with stirring, and the resulting material was allowed to age at least two days at 25° C.

(A)

| | Parts |
|---|---|
| Ethyl silicate consisting of 90–100% ethyl orthosilicate, any remainder being hexaethoxydisiloxane and octaethoxytrisiloxane | 600 |
| Ethyl alcohol | 513 |
| Water | 79 |
| 12 N HCl solution | 0.04 |

The resulting composition had 76% calculated hydrolysis of the silicate, i.e., 0.38 mol $H_2O$ per mol of alkoxy groups in the silicate, a pH calculated from the hydrogen ion concentration of the HCl to be 3.5 and an $SiO_2$ content of 14 percent by weight based on the combined weights of the silicate and alcohol.

(B)

Same as A but sufficient HCl to produce a calculated pH of 2.

(C)

| | Parts |
|---|---|
| Ethyl silicate having an $SiO_2$ content of 40–42% and consisting of about 50% ethyl orthosilicate, the remainder being low molecular weight silicate polymers | 1368 |
| Ethyl alcohol | 1517 |
| Water | 138 |
| 12 N HCl solution | 0.16 |

(D)

| | Parts |
|---|---|
| Ethyl silicate as in C | 45 |
| Ethyl alcohol | 52 |
| Water | 1.5 |
| 3% HCl solution in water | 1.5 |

$SiO_2$ content=18 percent by weight based on combined weights of silicate and alcohol.

(E)

| | Parts |
|---|---|
| Ethyl silicate as in C | 45 |
| Ethyl alcohol | 53.5 |
| Water | 0.75 |
| 3% HCl solution in water | 0.75 |

$SiO_2$ content—same as D.

(F)

| | Parts |
|---|---|
| Ethyl silicate as in A | 683 |
| Ethyl alcohol | 514 |
| Water | 79 |
| 12 N HCl solution | 0.33 |

$SiO_2$ content—approximately the same as A.

In this example, trimethyl borate was added as 68% by weight solution in methanol in Runs 1–17 and as a pure compound in Runs 18–22. The trimethoxy boroxine was added as 100% liquid. Percentages are by weight based on the weight of the silicate in the basic binder composition.

TABLE

| Run | Basic Binder | Methyl Borate, percent | Trimethoxy Boroxine, percent | Adhesion | Pencil Hardness After Time In Days | | | | |
|---|---|---|---|---|---|---|---|---|---|
| | | | | | 0.5 | 1 | 2 | 3 | 7 |
| 1 | A | | | Poor | <H | <H | <H | <H | <H |
| 2 | A | 0.34 | | Exc | <H | <H | <H | <H | H |
| 3 | A | 0.68 | | Exc | <H | H | 2H | 3H | 4H |
| 4 | A | 3.4 | | Exc | H | 2H | 3H | 4H | 4H |
| 5 | B | | | Fair | <H | <H | <H | <H | <H |
| 6 | B | | 1 | do | <H | <H | <H | H | 2H |
| 7 | B | | 2 | Good | <H | H | H | 2H | 3H |
| 8 | B | | 5 | do | H | 2H | 2H | 3H | 4H |
| 9 | B | | 10 | Exc | <H | H | H | 2H | 3H |
| 10 | B | | 20 | Exc | <H | H | H | 2H | 3H |
| 11 | C | | | Exc | <H | <H | H | 2H | 2H |
| 12 | C | 0.68 | | Exc | <H | H | 2H | 3H | 3H |
| 13 | C | 1.36 | | Exc | <H | 2H | 2H | 3H | 3H |
| 14 | D | | | Good | <H | <H | <H | <H | <H |
| 15 | D | 3.4 | | Exc | H | 3H | 3H | 3H | 4H |
| 16 | E | | | Good | <H | <H | <H | <H | <H |
| 17 | E | 3.4 | | do | H | 2H | 3H | 3H | 4H |
| 18 | F | | | Fair | <H | <H | <H | <H | <H |
| 19 | F | | 1 | Good | H | 2H | 3H | 4H | 4H |
| 20 | F | | 2 | Exc | H | 2H | 3H | 4H | 4H |
| 21 | F | | 5 | Good | H | 2H | 3H | 4H | 4H |
| 22 | F | | 10 | Exc | H | H | H | 3H | 3H |

Example II

A binder composition was prepared from the following:

| | Parts by weight |
|---|---|
| n-Butyl silicate having an $SiO_2$ content of 18.7 percent | 100 |
| Ethylene glycol monoethyl ether | 80 |
| Water | 9 |
| 12 N HCl solution | 0.005 |

The silicate and ethylene glycol monoethyl ether were mixed and heated to 50° C. The water and acid were mixed together and added to the silicate-solvent mixture over a one hour period. The resulting composition was aged at 25° C. for at least 24 hours. This composition had a calculated silicate hydrolysis of 80 percent (i.e., 1.6 moles of water reacted per mole of tetrabutyl ortho silicate), a calculated pH of 3.5 and an $SiO_2$ content of 10.4 percent by weight based on the combined weights of silicate and solvent.

A coating composition was made by mixing 25 parts by weight of the zinc dust employed in Example I with 9 parts by weight of the above binder composition. A steel panel coated with this coating composition dried very slowly and only had a pencil hardness of about B after one month at 22° C.

A similar binder composition was prepared incorporating in addition to the above hydrolyzed binder, after aging for 3 days, 0.69 part by weight of methyl borate added as a solution in 0.33 part of methanol. A coating composition was made by mixing 25 parts by weight of the same zinc dust employed in Example I and 9 parts by weight of the above borate-containing binder composition. A steel panel coated with the resulting slurry dried rapidly and in 2 days had an adhesive coating with a pencil hardness of at least 2H. The coating continued to harden to a pencil hardness of 4H. The abrasion resistance was excellent. The galvanic properties were superior.

Example III

When normal propyl borate and n-butyl borate are substituted mol per mol for the methyl borate in the runs of Example I, similar results are obtained.

Example IV

When aluminum flake, graphite, alumina, silica aerogel, silica aerogel tinted with an organic dye, silica aerogel with pigments such as zinc chromate, silica flour and zircon flour are each substituted for or used in conjunction with the zinc dust in the runs of Example I to give similarly viscous slurries, similar coating results are obtained. However, for a good adhesive, abrasion-resistant coating with superior galvanic protection for ferrous surfaces, the zinc dust content of the particulate component should be high.

Example V

Example I, Run 13, was repeated to prepare the binder. To 10 parts binder, 25 parts zinc dust and 2 parts of iron oxide pigment were mixed and applied to a clean polished steel panel. Drying occurred in a few minutes. However, hardening required standing overnight. The coating was an attractive pink, had excellent adhesion and hardness and good galvanic protection properties.

Example VI

Example I, Run 13, was repeated to prepare the binder. Thirty parts of binder were mixed with ½ part of a reinforcing silica aerogel and 0.1 part of a methylene blue dye. A zinc dust coated panel from Example I was top coated by spraying with the binder containing the dye and silica aerogel. After drying, a very bright attractive blue coating resulted which had excellent adhesion to the zinc dust coating substrate and which was stable to hot water aging (62° C.) for a long period. If the binder is applied to a clean steel panel without the zinc dust coating, very little protection or adhesion occurs.

Example VII

Example I, Run 13, was repeated to prepare the binder. Thirty parts of this binder and 0.1 part of a red organic dye and 0.5 part of silica aerogel were mixed and applied to a cured zinc dust silicate coating and allowed to dry for 12 hours. The resultant top coating was heat stable, as shown by the fact that no discoloration occurred in a steam bath at 62° C. after 1 week aging. The coating is attractive, none of the usual problems such as blisters encountered with organic coating of zinc dust coatings occurred on aging.

Example VIII

Example I, Run 13, was repeated to prepare the binder. Thirty parts of the binder was mixed with ½ part of silica aerogel, 0.2 part of red dye and 8 parts of zinc dust. A clean steel panel was coated with this composition. After drying, an attractive pink colored, hard adhesive coating resulted which gave good galvanic coating protection to the steel panel.

Example IX

Example I, Run 13, was repeated to prepare the binder. Ten parts of binder was mixed with 3 parts graphite. A zinc dust silicate coated and cured panel from Example I was top coated with the above graphite binder slurry to yield an attractive black coating which on drying had excellent adhesion and heat stability.

Example X

Four hundred fifty parts of ethylene glycol mono ethyl ether, 450 parts condensed ethyl silicate, 28.8 parts water and 2.7 parts of 1% (HCl) hydrochloric acid were mixed, aged for 3 days and 2% methyl borate azeotrope in methanol (67% by weight) added and further aged for 12 hours. The resulting composition contained a 30 to 40% hydrolyzed silicate and a pH of about 3.5. Ten parts of the above binder were mixed with 25 parts of a neutral salt-free fine zinc dust and allowed to age for long period while shaking. No gelation occurred after months of aging. When a steel panel was painted with the slurry, it dried in a few minutes, hardening rapidly (overnight) to a fine, very adhesive coating which had excellent galvanic property for protecting steel surfaces from corrosion.

Example XI

The experiment described in Example X was repeated with the addition of minor amounts of iron oxide to give a similarly stable slurry which had similar coating properties and an appealing colored coating.

What I claim is:

1. A binder composition for particulate solids comprising, in an organic solvent, the product obtained by the reaction in the presence of said solvent of an alkyl silicate and an alkyl borate, each of the alkyl groups in the silicate containing from 1 to 8 carbon atoms and being attached to silicon-bonded oxygen through a primary carbon atom, said borate being applied in an amount equivalent to from about .05 to about 80 percent of the weight of the silicate, each of the alkyl groups thereof containing from 1 to 8 carbon atoms, said solvent being applied in a quantity sufficient to make the $SiO_2$ content of the composition equal to 8-33 percent of the combined weights of the solvent and silicate.

2. A composition according to claim 1 where the alkyl group in the case of the silicate is ethyl, where the silicate is hydrolyzed to an extent not exceeding 95 percent, where the organic solvent is an alcohol having a boiling point of the order of 50° C.–160° C., and where the borate is applied in an amount within the range 0.05 to 10 percent by weight based on the weight of the silicate.

3. A composition according to claim 2 where the degree of hydrolysis of the silicate corresponds to from 0.1 to 0.35 mole of water per mole of alkoxy groups and the composition is acidified to a pH of not less than 1.5.

4. A composition according to claim 3 where the silicate is hydrolyzed using an amount of water not substantially in excess of ¼ mole of water per mole of alkoxy groups carried by the silicate, where the alkyl borate is methyl borate and is applied in an amount within the range 0.5 to 5 percent by weight based on the weight of the silicate and where the pH of the composition is adjusted by means of HCl so that it lies within the range 2 to 3.5.

5. A composition comprising from 10 to 90 percent by weight of a particulate inorganic solid and from 90 to 10 percent by weight of a composition conforming to claim 1.

6. A composition conforming to claim 5 where the particulate solid is zinc dust.

7. A stable one-package coating preparation capable of curing in a thin film to provide a hard surface covering, said preparation comprising from 10 to 90 percent by weight of a finely divided solid inorganic material and from 90 to 10 percent by weight of a binder composition comprising a product obtained by the reaction of an alkyl silicate containing from 1 to 8 carbon atoms in the alkyl group and from .05 to about 80 percent by weight based on the weight of the silicate of an alkyl borate in which each of the alkyl groups contains from 1 to 8 carbon atoms, said silicate as employed in the reaction being hydrolyzed to an extent not exceeding about 95 percent, each alkyl group thereof being attached to silicon-bonded oxygen through a primary carbon atom, said composition being further characterized in that it contains an organic solvent present in an amount such that the $SiO_2$ content of the composition is not less than 8 or in excess of 33 percent of the combined weights of the silicate and solvent.

8. A preparation according to claim 7 where the finely divided solid material is zinc dust, where the solvent is an alcohol having a boiling point of the order of 50° C.–160° C., where the silicate is ethyl silicate hydrolyzed to an extent corresponding to from 0.1 to 0.35 moles of water per mole of alkoxy groups and where the borate is methyl borate, applied in an amount within the range 0.05 to 5 percent on the weight of the silicate.

9. A substrate coated with a preparation comprising from 10 to 90 percent by weight of the particulate solid, the same being zinc dust, and from 90 to 10 percent by weight of the composition as defined in claim 1.

References Cited

UNITED STATES PATENTS

| 2,434,953 | 1/1948 | Patnode | 106—13 XR |
| 2,053,474 | 9/1936 | Graves et al. | 106—287 |
| 2,058,844 | 10/1936 | Vaughn | 106—287 |
| 2,524,357 | 10/1950 | Robey | 106—287 |
| 2,944,919 | 7/1960 | Morris et al. | 106—14 |
| 3,056,684 | 10/1960 | Lopata et al. | 106—14 |
| 3,270,382 | 9/1966 | Emblem et al. | 106—30.3 |

FOREIGN PATENTS

| 925,384 | 5/1963 | Great Britain. |

JAMES A. SEIDLECK, *Primary Examiner.*

ALEXANDER H. BRODMERKEL, *Examiner.*

L. HAYES, *Assistant Examiner.*